(12) United States Patent
Alsharif et al.

(10) Patent No.: US 11,748,685 B2
(45) Date of Patent: Sep. 5, 2023

(54) UTILIZING MACHINE LEARNING TO MEASURE APPLICATION DEVELOPERS' CYBERSECURITY COMPETENCIES

(71) Applicant: Saudi Arabian Oil Company, Dhahran (SA)

(72) Inventors: Sultan Saadaldean Alsharif, Khobar (SA); Bandar Abdulaziz Almashari, Dhahran (SA); Abdullah Abdulaziz Alturaifi, Dhahran (SA); Abdulmohsen Nasser Alotaibi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 3 days.

(21) Appl. No.: 17/574,789

(22) Filed: Jan. 13, 2022

(65) Prior Publication Data

US 2023/0222429 A1 Jul. 13, 2023

(51) Int. Cl.
*G06Q 10/0639* (2023.01)
*G06F 21/57* (2013.01)

(52) U.S. Cl.
CPC ..... *G06Q 10/06395* (2013.01); *G06F 21/577* (2013.01); *G06Q 10/06398* (2013.01); *G06F 2221/033* (2013.01)

(58) Field of Classification Search
None
See application file for complete search history.

(56) References Cited

U.S. PATENT DOCUMENTS 9,373,267 B2 6/2016 Sadeh-Koniecpol et al.
10,387,655 B2 8/2019 Copty et al.
(Continued)

FOREIGN PATENT DOCUMENTS

WO WO-2008092985 A1 * 8/2008 ............ G06F 21/50
WO WO-2015043448 A1 * 4/2015 ........... G06F 21/577

OTHER PUBLICATIONS

Sarker, Iqbal H., et al. "Cybersecurity data science: an overview from machine learning perspective." Journal of Big data 7 (2020): 1-29. (Year: 2020).*

(Continued)

*Primary Examiner* — Thomas L Mansfield
(74) *Attorney, Agent, or Firm* — Leason Ellis LLP (57) ABSTRACT

An automated method for improving application developers' cybersecurity competencies is provided. The method includes: breaking each application of a set of computer applications into one or more pieces each piece being developed by a corresponding one of a plurality of application developers; associating each piece of each application with its corresponding application developer; performing cybersecurity assessment testing on the set of computer applications in order to generate cybersecurity assessment results for the set of computer applications; building a cybersecurity competency profile for each application developer using the generated cybersecurity assessment results attributed to corresponding pieces associated with the application developer; grouping the application developers into at least two groups using unsupervised machine learning on the built cybersecurity competency profiles; and choosing, for each application developer based on the corresponding groups to which the application developer belongs, a subset of training courses to improve the cybersecurity competency of the application developer.

17 Claims, 8 Drawing Sheets

(56) References Cited

U.S. PATENT DOCUMENTS

| | | | |
|---|---|---|---|
| 10,534,912 B1* | 1/2020 | Youngberg | G06F 21/577 |
| 11,601,462 B2* | 3/2023 | Feiman | H04L 63/1433 |
| 2002/0077884 A1 | 6/2002 | Sketch | |
| 2004/0133437 A1 | 7/2004 | Draper et al. | |
| 2014/0199663 A1* | 7/2014 | Sadeh-Koniecpol | H04L 63/1408 434/118 |
| 2015/0096036 A1* | 4/2015 | Beskrovny | G06F 21/577 726/25 |
| 2015/0309813 A1 | 10/2015 | Patel | |
| 2017/0078322 A1* | 3/2017 | Seiver | H04L 63/1433 |
| 2017/0329693 A1* | 11/2017 | Li | G06F 11/3604 |
| 2018/0089437 A1* | 3/2018 | Baset | G06F 21/577 |
| 2019/0114435 A1* | 4/2019 | Bhalla | G06F 21/55 |
| 2019/0146986 A1* | 5/2019 | Dewan | G06F 16/00 707/737 |
| 2019/0236483 A1 | 8/2019 | Duer et al. | |
| 2019/0342324 A1* | 11/2019 | Nawy | G06F 16/2228 |
| 2020/0379756 A1* | 12/2020 | Gupta | G06F 16/24578 |
| 2021/0303696 A1* | 9/2021 | Weber | G06F 21/577 |
| 2022/0067169 A1* | 3/2022 | De Cremer | G06F 9/451 |

OTHER PUBLICATIONS

Lehto, Martti. "Cyber security competencies: cyber security education and research in Finnish universities." ECCWS2015—Proceedings of the 14th European Conference on Cyber Warfare & Security: ECCWS. vol. 2015. 2015. (Year: 2015).*

Brilingaitė, Agnė, Linas Bukauskas, and Aušrius Juozapavičius. "A framework for competence development and assessment in hybrid cybersecurity exercises." Computers & Security 88 (2020): 101607. (Year: 2020).*

Carlton, Melissa, and Yair Levy. "Expert assessment of the top platform independent cybersecurity skills for non-IT professionals." SoutheastCon 2015. IEEE, 2015. (Year: 2015).*

Sarker et al.; Cybersecurity data science: an overview from machine learning perspective; https://link.springer.com/article/10.1186/s40537-020-00318-5; Journal of Big Data 7, No. 1 (2020): pp. 1-29.

* cited by examiner

Developer 3 Profile

| Assessment ID | Vulnerability |
|---|---|
| Assessment 1 | CWE 74: Injections |
| Assessment 2 | CWE 74: Injections |
| Assessment 2 | CWE 338: Error Handling |
| Assessment 3 | CWE 20: Input Validation |
| Assessment N | CWE 20: Input Validation |

FIG. 5B

Vulnerabilities Categories and Security Competencies

| Vulnerability | Category | Security Competency |
|---|---|---|
| CWE 74: Injections | Category 1 | Input Validation |
| CWE 338: Error Handling | Category 2 | Error Handling |
| CWE 20: Input Validation | Category 1 | Input Validation |
| CWE 116: Output Validation | Category 3 | Output Validation |

FIG. 5C

Average Scoring of Developers in Vulnerabilities Categories

|  | Category 1 | Category 2 | Category 3 | Category n-1 | Category n |
|---|---|---|---|---|---|
| Developer 1 | 3.2 | 8.1 | 6.3 | 0 | 1.2 |
| Developer 2 | 3.1 | 7.9 | 5.3 | 0 | 1.3 |
| Developer 3 | 1.2 | 1.8 | 3.9 | 4.2 | 3.7 |
| Developer n-1 | 9.6 | 1.9 | 0 | 2.2 | 4.2 |
| Developer n | 9.8 | 2.1 | 0 | 3.6 | 5.7 |

Average Decay Rate and Courses Rating

|  | Course 1 Avg Decay Rate | Course n Avg Decay Rate | Course 1 Rating | Course n Rating |
|---|---|---|---|---|
| Developer 1 | N/A | 7.3 | N/A | 8.6 |
| Developer 2 | 2.1 | 1.2 | 5.6 | 7.1 |
| Developer 3 | 11.2 | 15.8 | 10 | 10 |
| Developer n-1 | 1.9 | 1.9 | 4.3 | 6.6 |
| Developer n | 4.6 | 6.6 | 10 | 7.3 |

Start
↓

Break each application of set of computer applications into 1 or more pieces each piece being developed by corresponding 1 of plurality of application developers
810
↓

Associate each piece of each application with its corresponding 1 of plurality of application developers
820
↓

Perform cybersecurity assessment testing on set of computer applications in order to generate cybersecurity assessment results for set of computer applications, each assessment result being attributed to corresponding piece of 1 or more pieces of corresponding 1 of set of applications
830
↓

Build cybersecurity competency profile for each application developer using generated cybersecurity assessment results attributed to corresponding pieces associated with application developer
840
↓

Group plurality of application developers into at least 2 groups using unsupervised machine learning on built cybersecurity competency profiles, each group being disjoint with at least 1 other of the at least 2 groups
850
↓

Choose, for each application developer based on corresponding groups to which application developer belongs, subset of training courses to improve cybersecurity competency of application developer from among categorized set of cybersecurity competency training courses
860
↓

End

UTILIZING MACHINE LEARNING TO MEASURE APPLICATION DEVELOPERS' CYBERSECURITY COMPETENCIES

FIELD OF THE DISCLOSURE

The present disclosure relates to techniques for utilizing machine learning to measure application developers' cybersecurity competencies.

BACKGROUND OF THE DISCLOSURE

The importance of developing secure applications is recognized by information technology (IT) managers worldwide. Applications need to be protected against cyberattacks and data breaches by ensuring code defects and security flaws are remediated during the development lifecycle process. The effectiveness of this integration between security and the development process is dependent on experienced application developers with cybersecurity knowledge. An inexperienced application developer who builds applications with code defects could potentially cost the organization significant loss. This could be in the form of a hacked application that interrupts business operations, damages reputation, and costs unforeseen financial loss. IT managers are challenged with the breadth of cybersecurity training courses, training vendors, and skills required. Building a specialized and tailored training plan for each application developer is important to maximize the training program return on investment (ROI) by identifying areas of improvements in cybersecurity programming skills.

It is in regard to these and other problems in the art that the present disclosure is directed to provide a technical solution for an effective method, system, and computer-readable medium for utilizing machine learning to measure application developers' cybersecurity competencies.

SUMMARY OF THE DISCLOSURE

According to a first aspect of the disclosure, an automated method for improving application developers' cybersecurity competencies is provided. The method comprises: breaking each application of a set of computer applications into one or more pieces each piece being developed by a corresponding one of a plurality of application developers; associating each piece of each application with its corresponding one of the plurality of application developers; performing cybersecurity assessment testing on the set of computer applications in order to generate cybersecurity assessment results for the set of computer applications, each assessment result being attributed to a corresponding piece of the one or more pieces of a corresponding one of the set of applications; building a cybersecurity competency profile for each application developer using the generated cybersecurity assessment results attributed to corresponding pieces associated with the application developer; grouping the plurality of application developers into at least two groups using unsupervised machine learning on the built cybersecurity competency profiles, each group being disjoint with at least one other of the at least two groups; and choosing, for each application developer based on the corresponding groups to which the application developer belongs, a subset of training courses to improve the cybersecurity competency of the application developer from among a categorized set of cybersecurity competency training courses.

In an embodiment consistent with the above, building the cybersecurity competency profile for each application developer comprises: for each assessment result of the generated cybersecurity assessment results associated with the application developer, identifying one or more software weaknesses associated with the assessment result from among a plurality of categorized software weaknesses; and building the cybersecurity competency profile for the application developer using the identified software weaknesses.

In an embodiment consistent with the above, building the cybersecurity competency profile for the application developer further comprises: associating each identified software weakness with a corresponding competency category of a plurality of security competency categories; for each competency category, scoring a competence of the application developer in the competency category in accordance with the identified software weaknesses associated with the competency category; and building the cybersecurity competency profile for the application developer using the scored competences of the application developer across the plurality of security competency categories.

In an embodiment consistent with the above, the method further comprises for each application developer: after taking the subset of training courses, re-performing the cybersecurity assessment testing on the set of computer applications in order to generate updated cybersecurity assessment results for the set of computer applications; building an updated cybersecurity competency profile including updated scored competences using the generated updated cybersecurity assessment results attributed to corresponding piece associated with the application developer; and determining for each security competency category a decay rate of the respective scored competence using the scored competences and the updated scored competences.

In an embodiment consistent with the above, the plurality of categorized software weaknesses comprises the Common Weaknesses Enumeration (CWE).

In an embodiment consistent with the above, performing the cybersecurity assessment testing on the set of computer applications comprises: performing static application security testing (SAST) on the set of computer applications in order to generate SAST assessment results for the set of computer applications; and performing dynamic application security testing (DAST) on the set of computer applications in order to generate DAST assessment results for the set of computer applications, wherein the generated cybersecurity assessment results comprise the generated SAST assessment results and the generated DAST assessment results.

In an embodiment consistent with the above, the unsupervised machine learning comprises clustering.

According to another aspect of the disclosure, an automated system for improving application developers' cybersecurity competencies is provided. The system comprises: a cybersecurity enhancement circuit; a non-transitory storage device storing instructions thereon that, when executed by the cybersecurity enhancement circuit, cause the cybersecurity enhancement circuit to: break each application of a set of computer applications into one or more pieces each piece being developed by a corresponding one of a plurality of application developers; associate each piece of each application with its corresponding one of the plurality of application developers; perform cybersecurity assessment testing on the set of computer applications in order to generate cybersecurity assessment results for the set of computer applications, each assessment result being attributed to a corresponding piece of the one or more pieces of a corresponding one of the set of applications; build a cybersecurity competency profile for each application developer using the generated cybersecurity assessment results attributed to corresponding pieces associated with the application developer; group the plurality of application developers into at least two groups using unsupervised machine learning on the built cybersecurity competency profiles, each group being disjoint with at least one other of the at least two groups; and choose, for each application developer based on the corresponding groups to which the application developer belongs, a subset of training courses to improve the cybersecurity competency of the application developer from among a categorized set of cybersecurity competency training courses.

In an embodiment consistent with the system described above, building the cybersecurity competency profile for each application developer comprises: for each assessment result of the generated cybersecurity assessment results associated with the application developer, identifying one or more software weaknesses associated with the assessment result from among a plurality of categorized software weaknesses; and building the cybersecurity competency profile for the application developer using the identified software weaknesses.

In an embodiment consistent with the system described above, building the cybersecurity competency profile for the application developer further comprises: associating each identified software weakness with a corresponding competency category of a plurality of security competency categories; for each competency category, scoring a competence of the application developer in the competency category in accordance with the identified software weaknesses associated with the competency category; and building the cybersecurity competency profile for the application developer using the scored competences of the application developer across the plurality of security competency categories.

In an embodiment consistent with the system described above, the instructions, when executed by the cybersecurity enhancement circuit, further cause the cybersecurity enhancement circuit to, for each application developer: after taking the subset of training courses, re-perform the cybersecurity assessment testing on the set of computer applications in order to generate updated cybersecurity assessment results for the set of computer applications; build an updated cybersecurity competency profile including updated scored competences using the generated updated cybersecurity assessment results attributed to corresponding piece associated with the application developer; and determine for each security competency category a decay rate of the respective scored competence using the scored competences and the updated scored competences.

In an embodiment consistent with the system described above, the plurality of categorized software weaknesses comprises the Common Weaknesses Enumeration (CWE).

In an embodiment consistent with the system described above, performing the cybersecurity assessment testing on the set of computer applications comprises: performing static application security testing (SAST) on the set of computer applications in order to generate SAST assessment results for the set of computer applications; and performing dynamic application security testing (DAST) on the set of computer applications in order to generate DAST assessment results for the set of computer applications, wherein the generated cybersecurity assessment results comprise the generated SAST assessment results and the generated DAST assessment results.

In an embodiment consistent with the system described above, the unsupervised machine learning comprises clustering.

According to yet another aspect of the disclosure, a non-transitory computer readable medium (CRM) is provided. The CRM has computer instructions stored therein that, when executed by a processing circuit, cause the processing circuit to carry out an automated process of improving application developers' cybersecurity competencies. The process comprises: breaking each application of a set of computer applications into one or more pieces each piece being developed by a corresponding one of a plurality of application developers; associating each piece of each application with its corresponding one of the plurality of application developers; performing cybersecurity assessment testing on the set of computer applications in order to generate cybersecurity assessment results for the set of computer applications, each assessment result being attributed to a corresponding piece of the one or more pieces of a corresponding one of the set of applications; building a cybersecurity competency profile for each application developer using the generated cybersecurity assessment results attributed to corresponding pieces associated with the application developer; grouping the plurality of application developers into at least two groups using unsupervised machine learning on the built cybersecurity competency profiles, each group being disjoint with at least one other of the at least two groups; and choosing, for each application developer based on the corresponding groups to which the application developer belongs, a subset of training courses to improve the cybersecurity competency of the application developer from among a categorized set of cybersecurity competency training courses.

In an embodiment consistent with the CRM described above, building the cybersecurity competency profile for each application developer comprises: for each assessment result of the generated cybersecurity assessment results associated with the application developer, identifying one or more software weaknesses associated with the assessment result from among a plurality of categorized software weaknesses; and building the cybersecurity competency profile for the application developer using the identified software weaknesses.

In an embodiment consistent with the CRM described above, building the cybersecurity competency profile for the application developer further comprises: associating each identified software weakness with a corresponding competency category of a plurality of security competency categories; for each competency category, scoring a competence of the application developer in the competency category in accordance with the identified software weaknesses associated with the competency category; and building the cybersecurity competency profile for the application developer using the scored competences of the application developer across the plurality of security competency categories.

In an embodiment consistent with the CRM described above, the process further comprises for each application developer: after taking the subset of training courses, re-performing the cybersecurity assessment testing on the set of computer applications in order to generate updated cybersecurity assessment results for the set of computer applications; building an updated cybersecurity competency profile including updated scored competences using the generated updated cybersecurity assessment results attributed to corresponding piece associated with the application developer; and determining for each security competency category a decay rate of the respective scored competence using the scored competences and the updated scored competences.

In an embodiment consistent with the CRM described above, the plurality of categorized software weaknesses comprises the Common Weaknesses Enumeration (CWE).

In an embodiment consistent with the CRM described above, performing the cybersecurity assessment testing on the set of computer applications comprises: performing static application security testing (SAST) on the set of computer applications in order to generate SAST assessment results for the set of computer applications; and performing dynamic application security testing (DAST) on the set of computer applications in order to generate DAST assessment results for the set of computer applications, wherein the generated cybersecurity assessment results comprise the generated SAST assessment results and the generated DAST assessment results.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Example embodiments of the present disclosure are directed to techniques of utilizing machine learning to measure application developers' cybersecurity competencies. Example techniques are configured (e.g., through machine learning) to evaluate application developers' competencies and improve their skills through suggestions of needed training programs. Example techniques leverage the data generated from the security assessment tools in order to build a developers competency matrix that is used to suggest the necessary training to improve weak skill areas. In some such embodiments, these techniques are configured (such as programmed by code) to utilize the results of cybersecurity assessments generated by application security scanning tools in order to build respective profiles for application developers that include information about their skill levels in secure coding practices. Based on these profiles, some such embodiments are further configured (e.g., by code) to automatically identify areas of weakness for each developer and to automatically design a corresponding training program targeted towards improving these weak areas. By utilizing machine learning and with enough data from the application security scanning tools, some such embodiments are further configured (such as programmed) to automatically build corresponding cybersecurity training programs around skills that the developers most lack and are most needed to improve and avoid security flaws and vulnerabilities in computer software and applications built or maintained by the developers.

Organizations often spend around 2-2.5% of their budgets on training. These budgets could be wasted if not spent on training that fulfills the organizations' needs. At the same time, IT managers and training coordinators are challenged to choose the proper training due to the huge number of subjects in many IT fields and vendors that offer many training programs. This is especially challenging in the field of cybersecurity training, where training programs are rapidly changing to cope with the ever-changing attack techniques and evolving cybersecurity threats. To identify organizational training needs, training coordinators perform training needs analysis to identify areas of skill gaps that need to be closed. Here, training needs analysis is a process that a business goes through in order to determine what training needs to be completed in a certain period in order to allow their teams to complete their jobs as effectively as possible, as well as progress and grow.

It is in regard to these and other problems and challenges that embodiments of the present disclosure are directed to effective techniques for utilizing machine learning to measure application developers' cybersecurity competencies. Example embodiments evaluate application developers' competencies, utilize data generated from automated tools, and use machine learning to categorize. Some such embodiments utilize data generated from automated tools and use machine learning in order to categorize training programs based on the assessment results. In some example embodiments, when building software applications, cybersecurity assessments are performed to identify potential software flaws and weaknesses. These assessments are performed using specialized tools that are configured (e.g., by code) to identify flaws and vulnerabilities in an automated manner. In some such embodiments, a cybersecurity enhancement system is configured (such as programmed) to use these tools in order to assess the applications built by a specific software developer, and to identify the developer's skill level is identified by how secure his applications are, as assessed by the tools. In some such embodiments, after collecting enough data about the developer's security assessment results, the cybersecurity enhancement system is further configured (e.g., by code) to construct a profile about the developer, identifying areas of strengths and weaknesses. In some such embodiments, the system is further configured by code to use this profile to determine the training needs for the developer in order to improve his or her skills and to produce better code and more secure applications.

As an example, in an embodiment, if an application developer writes defective code that is susceptible to SQL injections (SQLi) or other code injection vulnerabilities that lead to harmful results (such as destroyed databases), then the cybersecurity enhancement systems is programmed to recommended training focusing on courses that teach how to validate user input and to sanitize data in order to avoid SQLi (or other code injection) attacks.

In some embodiments, as part of an organization's security controls and measures taken, applications undergo security testing during the development lifecycle by specialized cybersecurity assessment tools. These tools can detect code defects and security flaws before the applications are compromised by a cyberattack. One family of tools perform Static Application Security Testing (SAST), which is a type of security testing that relies on inspecting the source code of an application. Another family of tools offer Dynamic Application Security Testing (DAST), which is a process of testing an application or software product in an operating state. Together, SAST and DAST can detect numerous defects and vulnerabilities of applications before such applications are released for widespread distribution. These defects and vulnerabilities can then be addressed (e.g., neutralized) prior to distributing the applications. These assessment tools generate enormous amount of data in the form of reports and logs for each application. Part of that data contains information (such as source code location or application developer indication) that can help identify the application developer responsible for developing the source code.

Example embodiments of these features and techniques are illustrated in FIGS. 1-8 and described in the text that follows. With the exception of the application developers (to which the described embodiments are intended to assist), each of the steps, components, or parts thereof is automated and can be performed by one or more (possibly shared) processing engines (such as a microprocessor or custom logic circuits) configured (e.g., by code or other logic) to carry out the task. For ease of description, this electronic processing hardware will be referred to as a processing circuit (or cybersecurity enhancement circuit), but will be understood to be one or more such circuits or portions thereof.

Figure 1:
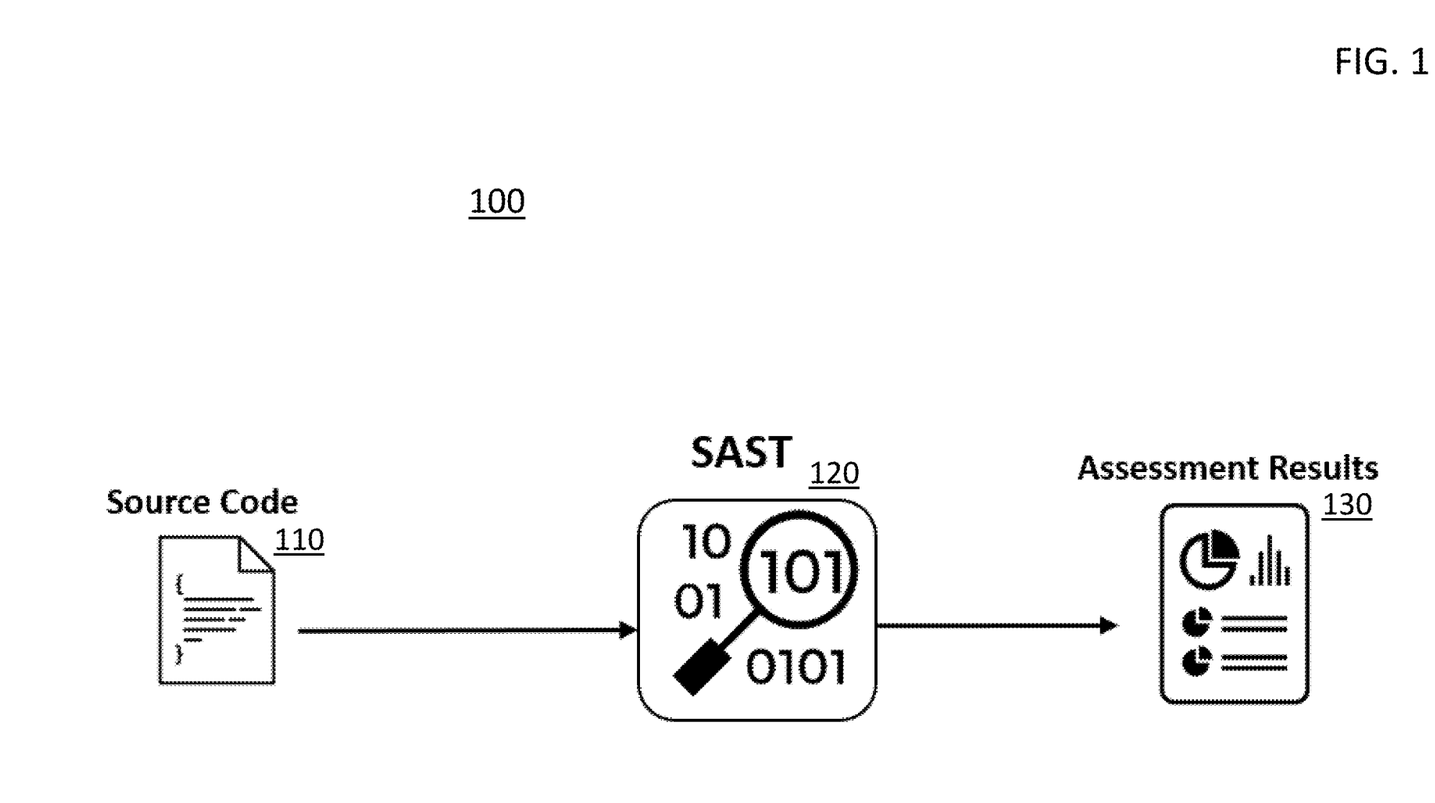
FIG. 1 is a schematic diagram of an example Static Application Security Testing (SAST) component for utilizing machine learning to measure application developers' cybersecurity competencies, according to an embodiment.
Figure 2:
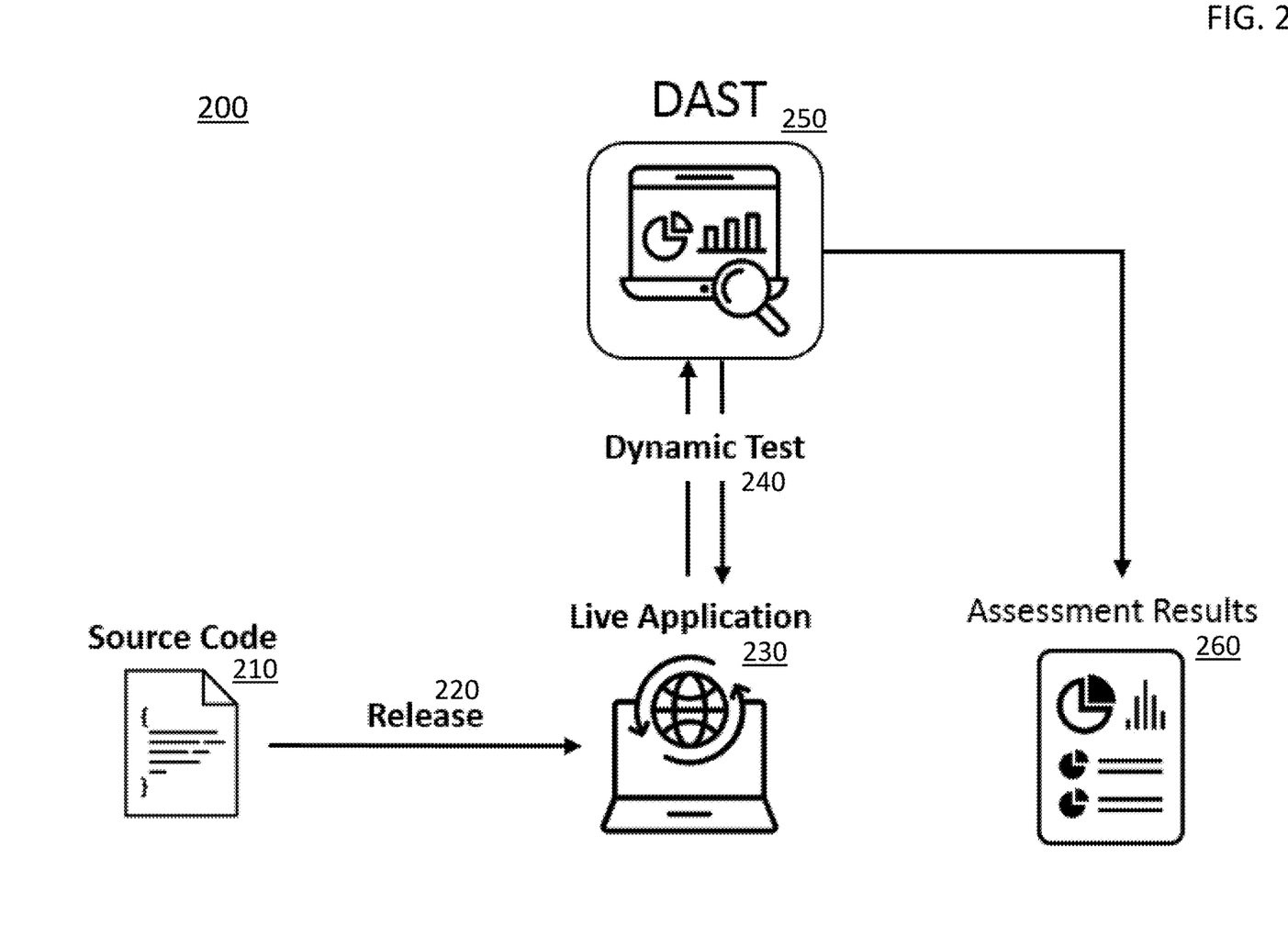
FIG. 2 is a schematic diagram of an example Dynamic Application Security Testing (DAST) component for utilizing machine learning to measure application developers' cybersecurity competencies, according to an embodiment.

FIG. 1 is a schematic diagram of an example Static Application Security Testing (SAST) component 100 for utilizing machine learning to measure application developers' cybersecurity competencies, according to an embodiment. FIG. 2 is a schematic diagram of an example Dynamic Application Security Testing (DAST) component 200 for utilizing machine learning to measure application developers' cybersecurity competencies, according to an embodiment.

Two approaches for performing applications security assessment are SAST and DAST. With reference to FIG. 1, SAST (such as from SAST module 120) tests the source code 110 of an application in a non-running state, such as before the application is live and before the source code 110 of the application is compiled. The SAST module 120 is configured (e.g., by code) to review the source code 110 and identify potential sources of vulnerability in the source code 110. The SAST module 120 is further configured (e.g., programmed) to output any identified vulnerabilities to assessment results 130 for downstream.

By contrast, and with reference to FIG. 2, DAST (such as from DAST module 250) tests the compiled code (such as live application 230) in order to detect any vulnerabilities. In further detail, the source code 210 of the application is compiled into a release 220 of the application software and stored as the live application 230. The live application 230 functions as a black box, accepting inputs from and returning outputs to the DAST module 250, which is configured (e.g., by code) to perform a dynamic test 240 on the live application 230, such as simulating live cyberattacks as might be used on the live application 230 under a production setting. In some embodiments, the DAST module 250 is configured by code to test the application 230 after the application is built and released 220. The DAST module 250 is further configured (e.g., programmed) to output its assessment results 260, such as a list of all vulnerabilities detected during its dynamic test 240 of the live application 230.

Each type of testing (SAST and DAST) offers test cases that detect specific security flaws. In some embodiments, SAST is performed in the early stages of the development lifecycle while DAST is used after the application is released. Using both types of testing helps reduce or minimize the number of security flaws and vulnerabilities that otherwise escape detection before the application reaches general distribution.

Figure 3:
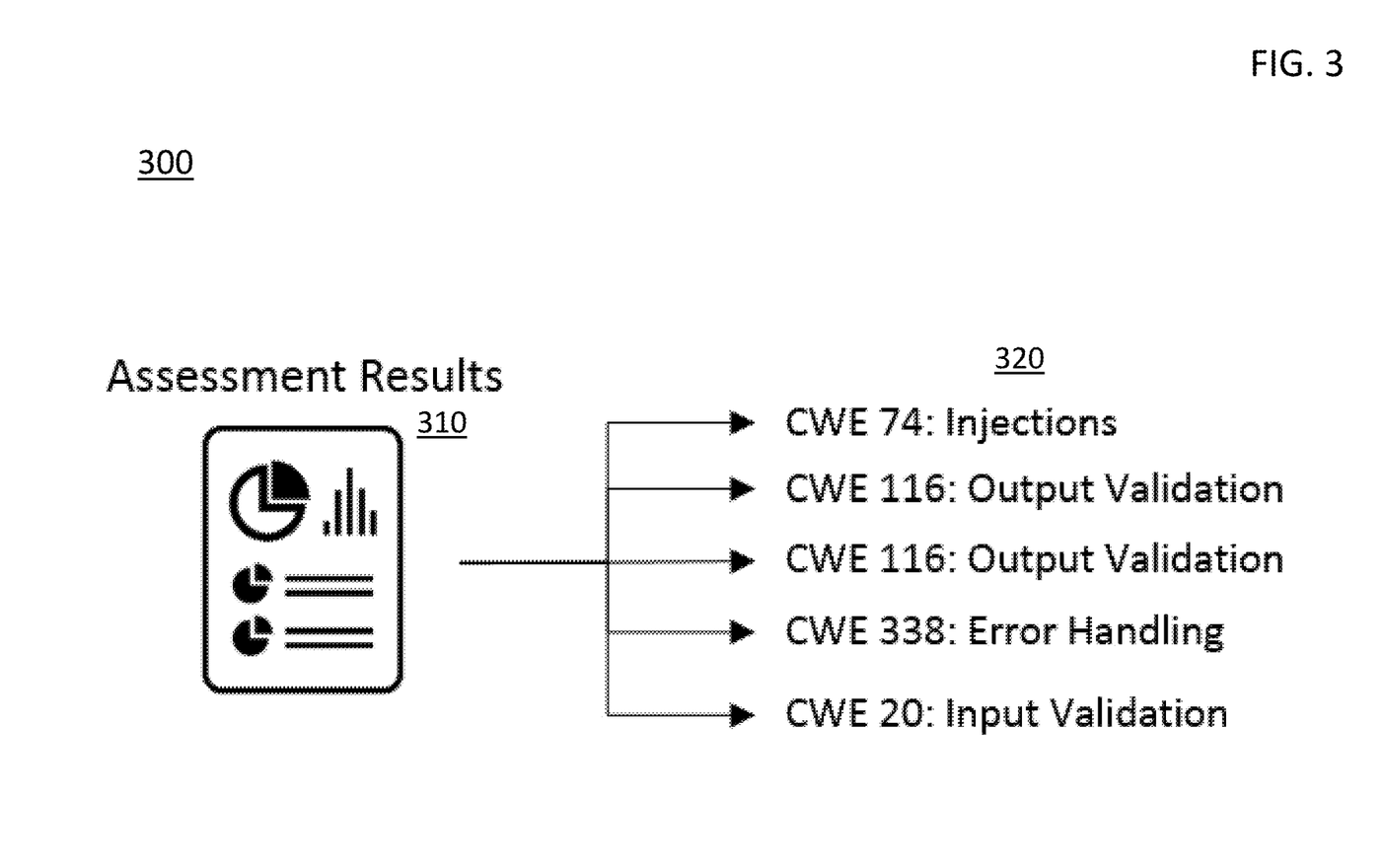
FIG. 3 is a schematic diagram of an example assessment results component for utilizing machine learning to measure application developers' cybersecurity competencies, according to an embodiment.

FIG. 3 is a schematic diagram of an example assessment results component 300 for utilizing machine learning to measure application developers' cybersecurity competencies, according to an embodiment. When using the assessment tools (such as SAST module 120 or DAST module 250) to scan an application (such as source code 110 or live application 230), they detect security flaws and vulnerabilities (such as reported in assessment results 130 or 260). In some embodiments, these detected security flaws (assessment results 310) are categorized 320 based on classification systems such as the Common Weaknesses Enumeration (CWE). CWE is a formal list or dictionary of common software weaknesses that can occur in software architecture, design, code, or implementation that can lead to exploitable security vulnerabilities. Each security type 320 has a description and mitigation recommendation to fix that vulnerability.

Figure 4:
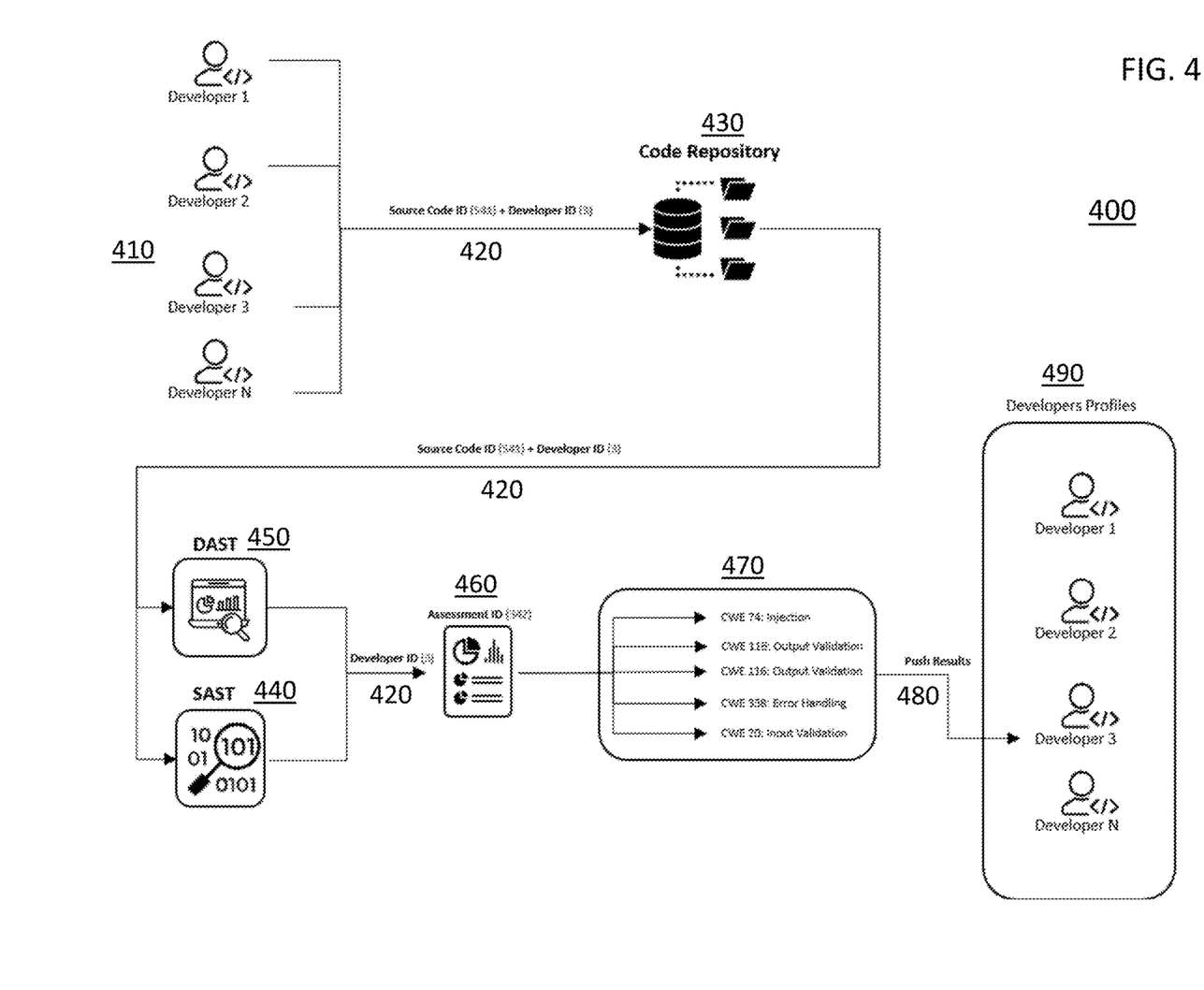
FIG. 4 is a schematic diagram of an example application developer profiling component for utilizing machine learning to measure application developers' cybersecurity competencies, according to an embodiment.

FIG. 4 is a schematic diagram of an example application developer profiling component 400 for utilizing machine learning to measure application developers' cybersecurity competencies, according to an embodiment. A group of application developers 410 is responsible for the building and maintaining of a set of applications (such as applications built and released from code repository 430). Utilizing assessment results 470 (such as assessment results 310), the profiling component 400 is configured (such as by code) to build a profile 490 for each application developer 410 that provides information about their skill level and the weak areas they need to improve.

In further detail, the source code for the code repository 430 is broken into pieces (e.g., modules, routines, functions, or other source code components) that are individually assignable to a particular application developer. These source code pieces are uniquely identified (e.g., by number) as are the corresponding application developers that own or are assigned them. As such, the developer ID and source code ID (together referred to as ID 420) are injected into the source code repository 430 (in both source and compiled forms) in order to associate each piece of code with the actual developer responsible for that piece. Upon building and releasing the application, the developer ID is injected into the assessment tool (e.g., SAST module 440 and DAST module 450) and published with the generated assessment report 460. The profiling component 400 is configured (e.g., programmed) to push 480 this assessment report 460, made up of assessment results 470 for each source code piece (by ID 420 for each source code piece and associated developer) to the developer's profile 490 based on the ID 420 (or developer ID) that is in the report 460.

Figure 5A:
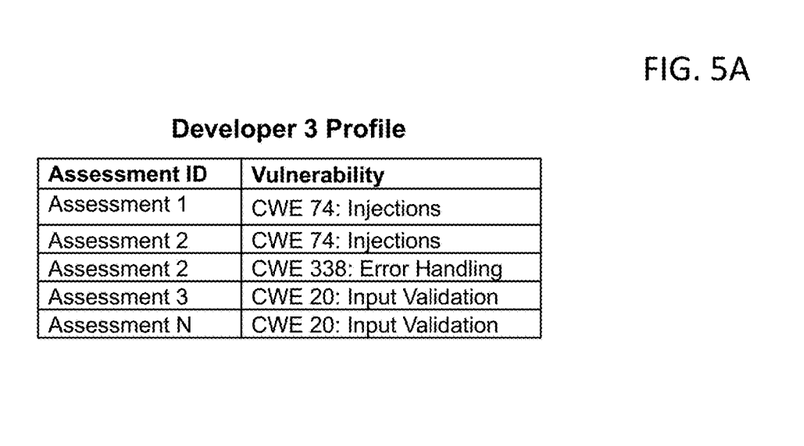
FIGS. 5A-5C are example tables illustrating application developer assessment results, software weaknesses and corresponding security competences, and application developer profiles, respectively, for utilizing machine learning to measure application developers' cybersecurity competencies, according to an embodiment.
Figure 5B:
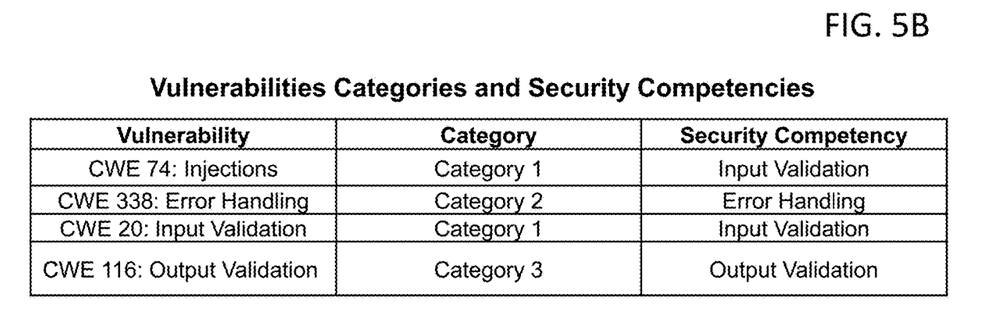
Figure 5C:
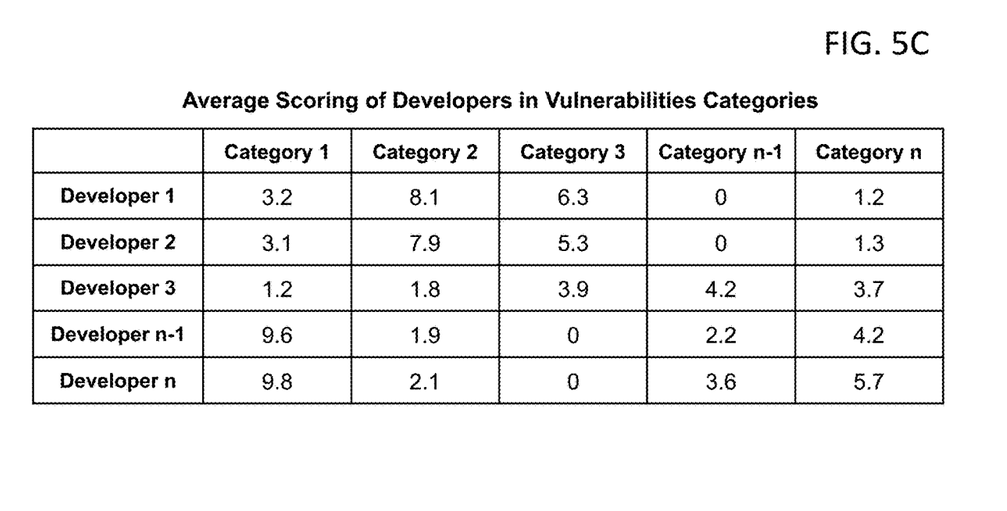

FIGS. 5A-5C are example tables illustrating application developer assessment results, software weaknesses and corresponding security competences, and application developer profiles, respectively, for utilizing machine learning to measure application developers' cybersecurity competencies, according to an embodiment.

In FIG. 5A, each developer's profile includes the results of all assessments performed on the pieces of code assigned to the developer and correlated to a corresponding assessment ID. As such, it represents a list of categorized weaknesses or vulnerabilities attributed to the developer. In particular, each weakness can appear multiple times, depending on the number of assessments that flagged that weakness.

In FIG. 5B, the vulnerabilities are divided into multiple categories, such that each category contains a set of vulnerabilities that are similar in nature and each category corresponds to a certain secure coding development competency (or security competency). Each competency can be thought of as a coding discipline whose deficiency can be addressed by a particular course (or courses) that are directed to improving that competency.

In FIG. 5C, based on the results of the assessments for each developer in their profile, an average score for each vulnerability category is calculated for the developer in order to generate a numerical assessment by category for each developer. As such, the data in this table represents a numerical profile (e.g., average score, such as average number of weaknesses assessed in a particular competency category) for each developer of their cybersecurity competence. This objective data is, in turn, used as the initial data input to a machine learning model for categorizing and tracking evolving developer competencies, as described further below.

Figure 6:
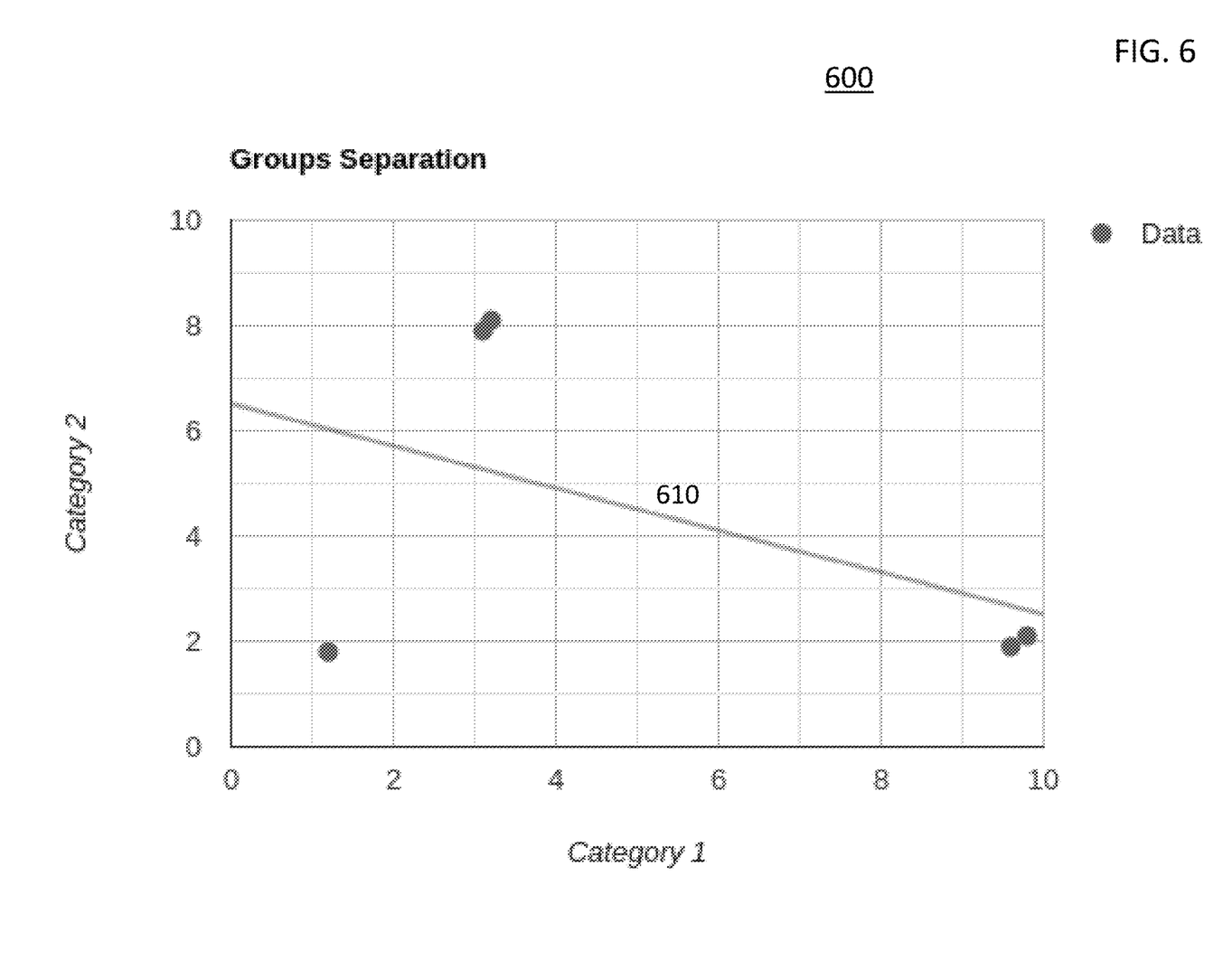
FIG. 6 is a graph illustrating an example application developer group separation, such as through unsupervised machine learning (e.g., clustering), for utilizing machine learning to measure application developers' cybersecurity competencies, according to an embodiment.

FIG. 6 is a graph 600 illustrating an example application developer group separation, such as through unsupervised machine learning (e.g., clustering), for utilizing machine learning to measure application developers' cybersecurity competencies, according to an embodiment. Clustering is an unsupervised machine learning technique that groups objects (or in this case, developers) together based on similarities of their underlying data. Clustering helps in learning from observational data and discovering new groups.

To better understand how the separation (grouping) works, in the graph 600, two security competency categories are chosen and illustrated as separate (X and Y) axes. Each developer is represented as a data point in the graph 600 based on their corresponding competencies in the two categories. Clustering determines a line 610 that separates the developers into groups, such as the developers under the line 610 being considered one group, and the developers above the line 610 being considered another group. The process is then repeated to include more categories and generate more groups. Eventually, the unsupervised machine learning process (clustering in this case) separates the developers into various groups (such as sets of disjoint groups) based on common weakness (or common strength) combinations shared among the various developers in each group. In this manner, tailored cybersecurity courses or course selection can be directed to each group to help reduce or eliminate shared cybersecurity weaknesses within the group.

Figure 7:
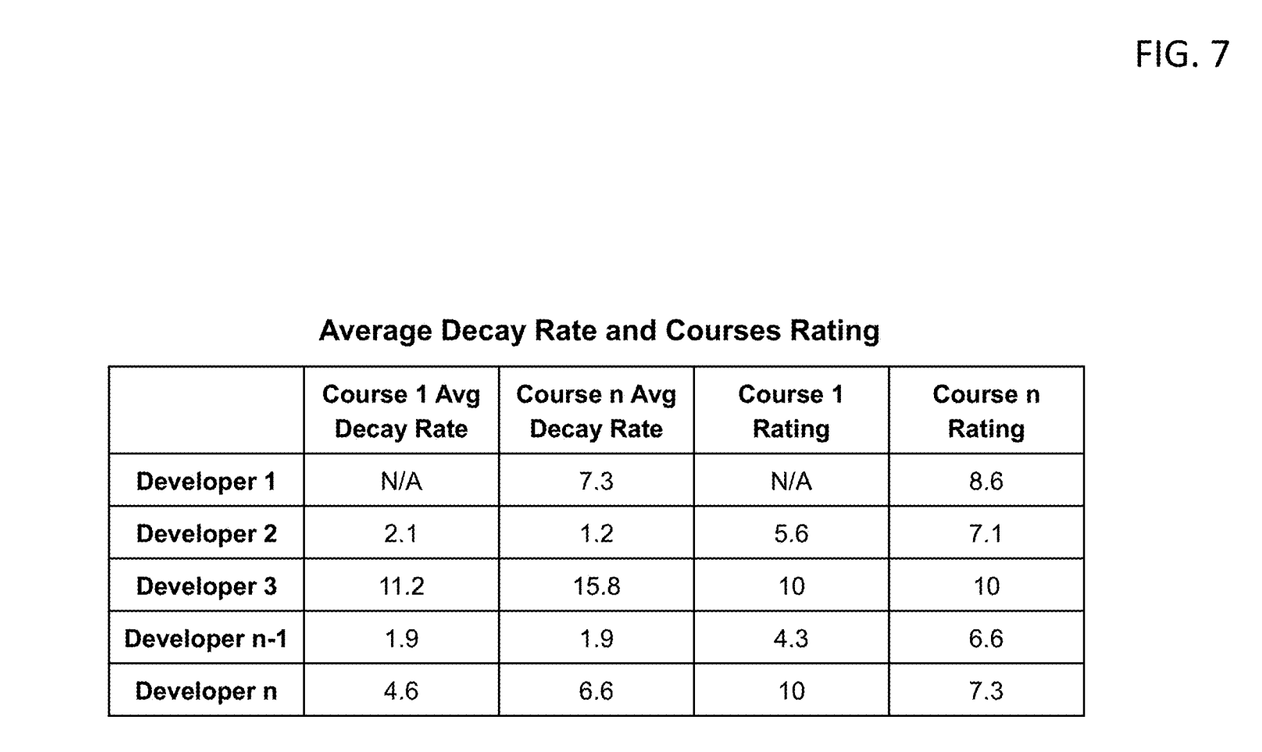
FIG. 7 is an example table illustrating training course average decay rates and ratings across the different application developers, for utilizing machine learning to measure application developers' cybersecurity competencies, according to an embodiment.

FIG. 7 is an example table illustrating training course average decay rates and ratings across the different application developers, for utilizing machine learning to measure application developers' cybersecurity competencies, according to an embodiment. FIG. 7 thus represents the developers over time, having taken courses chosen as highly appropriate, e.g., those based on the unsupervised machine learning (clustering) stage illustrated in FIG. 6. FIG. 7 also represents the input to a second phase of machine learning, in this case for doing feedback modeling to learn how better to proceed with the developer training.

In some embodiments, an initial set of training courses is selected, such as for each category or each group of developers sharing common cybersecurity competency weaknesses. For instance, this initial section can be done by training and cybersecurity experts. For instance, in some embodiments, at the beginning of the feedback modeling, the courses are recommended evenly between developers based on their groups. Then through an example feedback model illustrated in FIG. 7, two pieces of information are obtained for each course: (1) a subjective rating (e.g., on a ten-point scale) for each training course by each developer taking the course, and (2) an objective rating (e.g., decay rate over time of the average score of the different categories) of how the developer performed (was assessed) after each course. In some embodiments, the latter is measured by observing the increase or decrease in the assessment results for each category and the average decay rate then calculated across all categories. In some such embodiments, the assessment process used to generate the table in FIG. 5C is repeated over time to gauge the effects of the courses on the assessed cybersecurity weaknesses of the developers. In some such embodiments, the decay rate for a course is the average decay rate over the categories intended to be addressed by the course.

In some embodiments, for new developers that have not taken any courses, the cybersecurity enhancement system is configured (e.g., by code) to make course suggestions to the new developer based on the course suggestions made to the current developers having similar assessments, such as those from FIG. 5C. Further, for existing developers that have already taken multiple courses, a second machine learning model is used to suggest courses for them. This model is configured to learn from the decay rate over time for these developers and how they rated each course, and then looking at the current developer's data. The model is further configured to understand (e.g., through machine learning) how the existing developers improved their performance and what courses helped with that, and then suggest a similar set of courses to the current developer. In some such embodiments, the output of the second machine learning model is the probability of how likely the current developer that we are trying to suggest courses to would benefit from the given course being suggested. Then, based on the previous output from the model, the model is programmed to suggest courses (e.g., the top N courses, or those courses having a likelihood of benefiting the developer of at least N %) for the existing developer, and then repeat the process and monitor the existing developer's performance over time.

Figure 8:
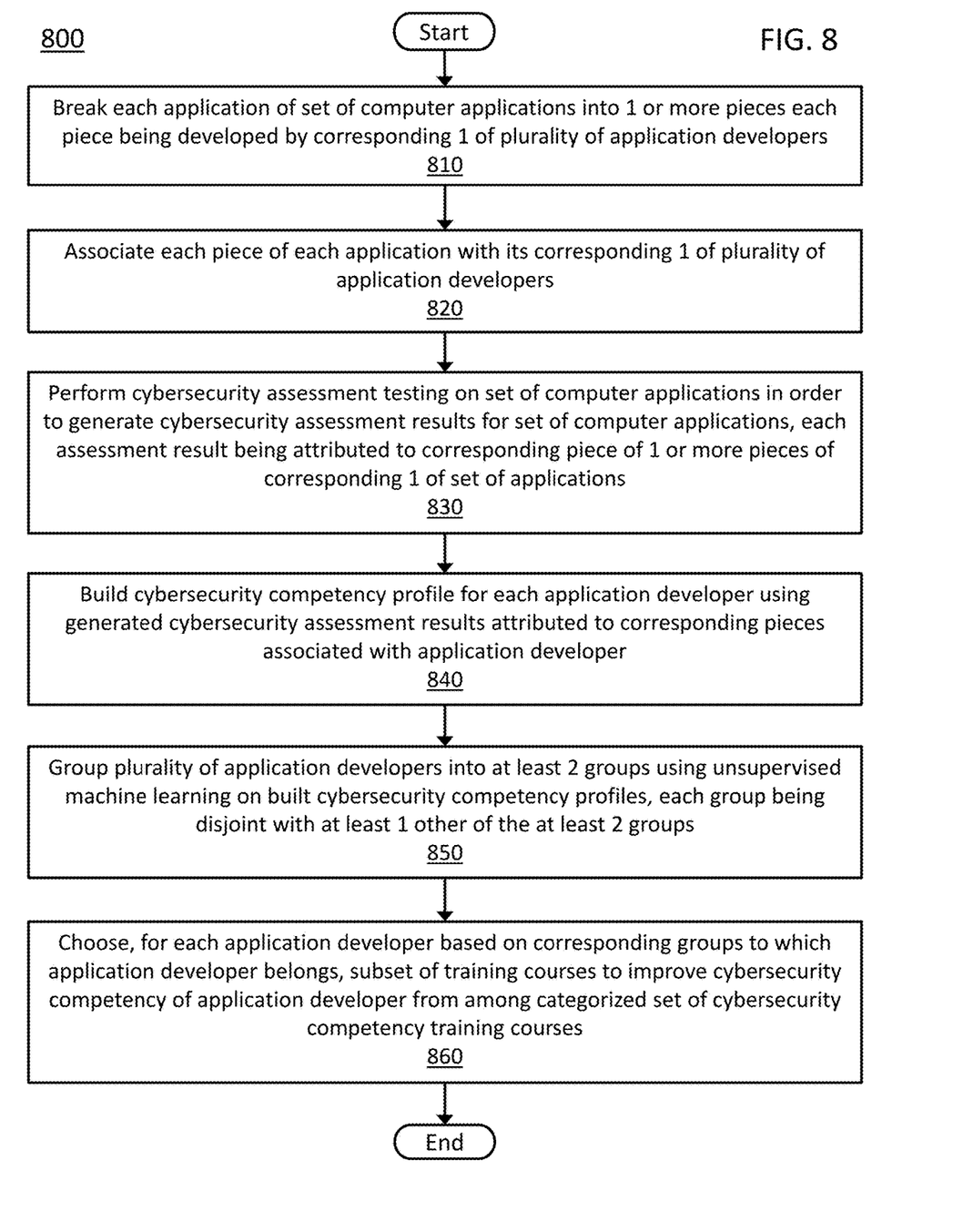
FIG. 8 is a flow diagram of an example method for utilizing machine learning to measure application developers' cybersecurity competencies, according to an embodiment.

FIG. 8 is a flow diagram of an example automated method 800 for utilizing machine learning to measure application developers' cybersecurity competencies, according to an embodiment. The method 800 can be performed by a cybersecurity enhancement circuit (e.g., microprocessor, custom logic) programmed or otherwise configured to perform the steps. Processing begins with the step of breaking 810 each application of a set of computer applications into one or more pieces. Each piece is developed by a corresponding one of a plurality of application developers (such as application developers 410). The method 800 further includes the step of associating 820 each piece of each application with its corresponding one of the plurality of application developers. In addition, the method 800 includes the step of performing 830 cybersecurity assessment testing (such as SAST 120 or 440, and DAST 250 or 450) on the set of computer applications in order to generate cybersecurity assessment results (such as assessment results 130, 260, or 310) for the set of computer applications. Each assessment result is attributed to a corresponding piece of the one or more pieces of a corresponding one of the set of applications.

The method 800 also includes the step of building 840 a cybersecurity competency profile for each application developer using the generated cybersecurity assessment results attributed to corresponding pieces associated with the application developer. In addition, the method 800 includes the step of grouping 850 the plurality of application developers into at least two groups using unsupervised machine learning (such as clustering) on the built cybersecurity competency profiles. Each group is disjoint with at least one other of the at least two groups. The method 800 further includes the step of choosing 860, for each application developer based on the corresponding groups to which the application developer belongs, a subset of training courses to improve the cybersecurity competency of the application developer from among a categorized set of cybersecurity competency training courses.

The different logic components (e.g., cybersecurity enhancement circuit, processing circuit) described throughout can be implemented in a variety of ways, including hardware (e.g., custom logic circuits), firmware (such as with customizable logic circuits), or software (e.g., computer instructions executable on a processing circuit such as an electronic processor or microprocessor). These components can include computing, control, or other logic circuits configured (e.g., programmed) to carry out their assigned tasks. In some example embodiments, their logic is implemented as computer code configured to be executed on a computing circuit (such as a microprocessor) to perform the steps that are part of the technique.

The automated methods described herein can be implemented by an electronic circuit configured (e.g., by code, such as programmed, by custom logic, as in configurable logic gates, or the like) to carry out the steps of the method. Some or all of the methods described herein can be performed using the components and techniques illustrated in FIGS. 1-8. In addition, these methods disclosed herein can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Any of the methods described herein may, in corresponding embodiments, be reduced to a non-transitory computer readable medium (CRM, such as a disk drive or flash drive) having computer instructions stored therein that, when executed by a processing circuit, cause the processing circuit to carry out an automated process for performing the respective methods.

The methods described herein may be performed in whole or in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An automated method for improving application developers' cybersecurity competencies, the method comprising:

breaking, using a cybersecurity enhancement circuit, each application of a set of computer applications into one or more pieces each piece being developed by a corresponding one of a plurality of application developers;

associating, using the cybersecurity enhancement circuit, each piece of each application with its corresponding one of the plurality of application developers;

performing, using the cybersecurity enhancement circuit, cybersecurity assessment testing on the set of computer applications in order to generate cybersecurity assessment results for the set of computer applications, each assessment result being a code defect or security flaw attributed to a corresponding piece of the one or more pieces of a corresponding one of the set of applications, wherein performing the cybersecurity assessment testing on the set of computer applications comprises:

performing, using the cybersecurity enhancement circuit, static application security testing (SAST) on the set of computer applications by inspecting the source code of the set of computer applications in order to generate SAST assessment results for the set of computer applications; and performing, using the cybersecurity enhancement circuit, dynamic application security testing (DAST) on the set of computer applications by testing the set of computer applications in an operating state in order to generate DAST assessment results for the set of computer applications, wherein the generated cybersecurity assessment results comprise the generated SAST assessment results and the generated DAST assessment results;

building, using the cybersecurity enhancement circuit, a cybersecurity competency profile for each application developer using the generated cybersecurity assessment results attributed to corresponding pieces associated with the application developer;

grouping, using the cybersecurity enhancement circuit, the plurality of application developers into at least two groups using unsupervised machine learning on the built cybersecurity competency profiles, each group being two or more of the plurality of application developers and that is disjoint with the application developers of at least one other of the at least two groups; and choosing, using the cybersecurity enhancement circuit for each application developer based on the corresponding groups to which the application developer belongs, a subset of training courses to improve the cybersecurity competency of the application developer from among a categorized set of cybersecurity competency training courses.

2. The method of claim 1, wherein building the cybersecurity competency profile for each application developer comprises:

for each assessment result of the generated cybersecurity assessment results associated with the application developer, identifying, using the cybersecurity enhancement circuit, one or more software weaknesses associated with the assessment result from among a plurality of categorized software weaknesses; and building, using the cybersecurity enhancement circuit, the cybersecurity competency profile for the application developer using the identified software weaknesses.

3. The method of claim 2, wherein building the cybersecurity competency profile for the application developer further comprises:

associating, using the cybersecurity enhancement circuit, each identified software weakness with a corresponding competency category of a plurality of security competency categories;

for each competency category, scoring, using the cybersecurity enhancement circuit, a competence of the application developer in the competency category in accordance with the identified software weaknesses associated with the competency category; and building, using the cybersecurity enhancement circuit, the cybersecurity competency profile for the application developer using the scored competences of the application developer across the plurality of security competency categories.

4. The method of claim 3, further comprising for each application developer:

after taking the subset of training courses, re-performing, using the cybersecurity enhancement circuit, the cybersecurity assessment testing on the set of computer applications in order to generate updated cybersecurity assessment results for the set of computer applications;

building, using the cybersecurity enhancement circuit, an updated cybersecurity competency profile including updated scored competences using the generated updated cybersecurity assessment results attributed to corresponding piece associated with the application developer; and determining, using the cybersecurity enhancement circuit for each security competency category, a decay rate of the respective scored competence using the scored competences and the updated scored competences.

5. The method of claim 2, wherein the plurality of categorized software weaknesses comprises the Common Weaknesses Enumeration (CWE).

6. The method of claim 1, wherein the unsupervised machine learning comprises clustering.

7. An automated system for improving application developers' cybersecurity competencies, the system comprising:

a cybersecurity enhancement circuit;

a non-transitory storage device storing instructions thereon that, when executed by the cybersecurity enhancement circuit, cause the cybersecurity enhancement circuit to:

break each application of a set of computer applications into one or more pieces each piece being developed by a corresponding one of a plurality of application developers;

associate each piece of each application with its corresponding one of the plurality of application developers;

perform cybersecurity assessment testing on the set of computer applications in order to generate cybersecurity assessment results for the set of computer applications, each assessment result being a code defect or security flaw attributed to a corresponding piece of the one or more pieces of a corresponding one of the set of applications, wherein the instructions, when executed by the cybersecurity enhancement circuit, further cause the cybersecurity enhancement circuit to:

perform static application security testing (SAST) on the set of computer applications by inspecting the source code of the set of computer applications in order to generate SAST assessment results for the set of computer applications; and perform dynamic application security testing (DAST) on the set of computer applications by testing the set of computer applications in an operating state in order to generate DAST assessment results for the set of computer applications, wherein the generated cybersecurity assessment results comprise the generated SAST assessment results and the generated DAST assessment results;

build a cybersecurity competency profile for each application developer using the generated cybersecurity assessment results attributed to corresponding pieces associated with the application developer;

group the plurality of application developers into at least two groups using unsupervised machine learning on the built cybersecurity competency profiles, each group being two or more of the plurality of application developers and that is disjoint with the application developers of at least one other of the at least two groups; and choose, for each application developer based on the corresponding groups to which the application developer belongs, a subset of training courses to improve the cybersecurity competency of the application developer from among a categorized set of cybersecurity competency training courses.

8. The system of claim 7, wherein building the cybersecurity competency profile for each application developer comprises:

for each assessment result of the generated cybersecurity assessment results associated with the application developer, identifying one or more software weaknesses associated with the assessment result from among a plurality of categorized software weaknesses; and building the cybersecurity competency profile for the application developer using the identified software weaknesses.

9. The system of claim 8, wherein building the cybersecurity competency profile for the application developer further comprises:

associating each identified software weakness with a corresponding competency category of a plurality of security competency categories;

for each competency category, scoring a competence of the application developer in the competency category in accordance with the identified software weaknesses associated with the competency category; and building the cybersecurity competency profile for the application developer using the scored competences of the application developer across the plurality of security competency categories.

10. The system of claim 9, wherein the instructions, when executed by the cybersecurity enhancement circuit, further cause the cybersecurity enhancement circuit to, for each application developer:

after taking the subset of training courses, re-perform the cybersecurity assessment testing on the set of computer applications in order to generate updated cybersecurity assessment results for the set of computer applications;

build an updated cybersecurity competency profile including updated scored competences using the generated updated cybersecurity assessment results attributed to corresponding piece associated with the application developer; and determine for each security competency category a decay rate of the respective scored competence using the scored competences and the updated scored competences.

11. The system of claim 8, wherein the plurality of categorized software weaknesses comprises the Common Weaknesses Enumeration (CWE).

12. The system of claim 7, wherein the unsupervised machine learning comprises clustering.

13. A non-transitory computer readable medium (CRM) having computer instructions stored therein that, when executed by a processing circuit, cause the processing circuit to carry out an automated process of improving application developers' cybersecurity competencies, the process comprising:

breaking each application of a set of computer applications into one or more pieces each piece being developed by a corresponding one of a plurality of application developers;

associating each piece of each application with its corresponding one of the plurality of application developers;

performing cybersecurity assessment testing on the set of computer applications in order to generate cybersecurity assessment results for the set of computer applications, each assessment result being a code defect or security flaw attributed to a corresponding piece of the one or more pieces of a corresponding one of the set of applications, wherein performing the cybersecurity assessment testing on the set of computer applications comprises:

performing static application security testing (SAST) on the set of computer applications by inspecting the source code of the set of computer applications in order to generate SAST assessment results for the set of computer applications; and performing dynamic application security testing (DAST) on the set of computer applications by testing the set of computer applications in an operating state in order to generate DAST assessment results for the set of computer applications, wherein the generated cybersecurity assessment results comprise the generated SAST assessment results and the generated DAST assessment results;

building a cybersecurity competency profile for each application developer using the generated cybersecurity assessment results attributed to corresponding pieces associated with the application developer;

grouping the plurality of application developers into at least two groups using unsupervised machine learning on the built cybersecurity competency profiles, each group being two or more of the plurality of application developers and that is disjoint with the application developers of at least one other of the at least two groups; and choosing, for each application developer based on the corresponding groups to which the application developer belongs, a subset of training courses to improve the cybersecurity competency of the application developer from among a categorized set of cybersecurity competency training courses.

14. The CRM of claim 13, wherein building the cybersecurity competency profile for each application developer comprises:

for each assessment result of the generated cybersecurity assessment results associated with the application developer, identifying one or more software weaknesses associated with the assessment result from among a plurality of categorized software weaknesses; and building the cybersecurity competency profile for the application developer using the identified software weaknesses.

15. The CRM of claim 14, wherein building the cybersecurity competency profile for the application developer further comprises:

associating each identified software weakness with a corresponding competency category of a plurality of security competency categories;

for each competency category, scoring a competence of the application developer in the competency category in accordance with the identified software weaknesses associated with the competency category; and building the cybersecurity competency profile for the application developer using the scored competences of the application developer across the plurality of security competency categories.

16. The CRM of claim 15, wherein the process further comprises for each application developer:

after taking the subset of training courses, re-performing the cybersecurity assessment testing on the set of computer applications in order to generate updated cybersecurity assessment results for the set of computer applications;

building an updated cybersecurity competency profile including updated scored competences using the generated updated cybersecurity assessment results attributed to corresponding piece associated with the application developer; and determining for each security competency category a decay rate of the respective scored competence using the scored competences and the updated scored competences.

17. The CRM of claim 14, wherein the plurality of categorized software weaknesses comprises the Common Weaknesses Enumeration (CWE).

* * * * *